April 5, 1966  M. H. SWEET  3,244,061

DIRECT READING TRI-STIMULUS COLOR ANALYZER

Filed Aug. 19, 1960  2 Sheets-Sheet 1

INVENTOR
MONROE H. SWEET

BY

ATTORNEY

3,244,061
DIRECT READING TRI-STIMULUS COLOR ANALYZER

Monroe H. Sweet, Binghamton, N.Y.; Russell P. Easton and First City National Bank of Binghamton, N.Y., administrators of said Monroe H. Sweet, deceased, assignors to General Aniline & Film Corporation, New York, N.Y., a corporation of Delaware
Filed Aug. 19, 1960, Ser. No. 50,731
1 Claim. (Cl. 88—14)

This invention relates to an apparatus and system for analyzing the color of fabric and, particularly, to an optical illuminating device for a sample to be tested.

It is the primary object of this invention to provide an apparatus and system which permit the scanning of a fabric sample on a wave-length by wave-length basis throughout the visible spectrum and enable integrating three response functions so as to obtain the C.I.E. tri-stimulus values X, Y, Z directly.

It is another object of the invention to provide an optical illuminating device which is capable of utilizing a narrow rectangular beam of a monochromatic source and transform this into a square pattern of the size of the sample to be tested and collect the light reflected therefrom with the minimum loss of flux and direct this at a sensing phototube.

A particular feature of this invention is that the illuminating device is simple in construction and adaptable to various types of photoelectric sensing elements and provides easy access to the fabric samples to be tested.

Other object and features will be apparent from the following description of the invention, defined in particularity in the appended claim and taken in connection with the accompanying drawing, in which:

Figure 1:
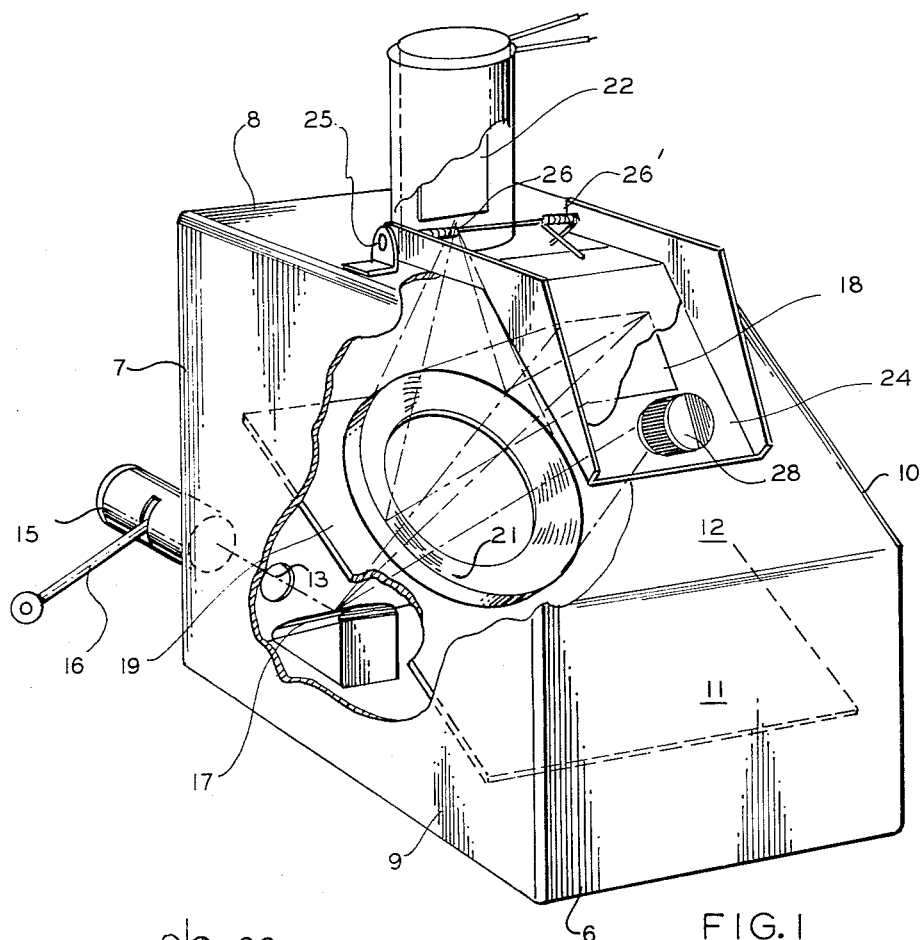
FIG. 1 is a perspective view of the optical illuminating device, partially cut away to show the location and position of the reflecting elements.

According to the C.I.E. system for determining colors of objects or illuminants, certain so-called tri-stimulus values are employed, these being necessary to determine the tri-chromatic coefficients by which colors may be located on the chromaticity diagrams. According to the present system, light reflected from a colored object, particularly a sample of fabric, may be analyzed by means of a photoelectric sensing element which is energized by the light reflected from the sample. The photoelectric current is wave-length integrated. During a single measuring cycle, the energy spectrum between 400 to 700 millimicrons is scanned and the sample subjected to light values of the spectrum in predetermined, substantially monochromatic steps throughout the entire range. The response of a photoelectric sensing element, such as a photomultiplier tube, is varied synchronously with the wave-length so that its sensitivity conforms to the $\bar{x}$, $\bar{y}$ and $\bar{z}$ functions for each measuring cycle. At the same time, the phototube anode current is continuously integrated so that the resulting output voltage is proportional to the tri-stimulus values X, Y, or Z, respectively. From these data, the trichromatic coefficients are calculated as follows:

$$x = \frac{X}{X+Y+Z} \quad y = \frac{Y}{X+Y+Z} \quad z = \frac{Z}{X+Y+Z}$$

In order to obtain the maximum light energy for the illumination of the sample from a source of substantially monochromatic light which produces a narrow rectangular beam, use is made of a semicylindrical reflecting surface so as to spread this beam uniformly over an area representing a quadrangle, which is the shape of the fabric sample to be analyzed. Light reflected from the sample is gathered by an annular ellipsoidal mirror, which is so positioned as to give free passage through its annular opening from the cylindrical reflected surface onto the sample and redirect the reflected light onto the phototube.

Referring to the figures, the optical illuminating device consists essentially of a housing 6 of rectangular shape, having a back wall 7, top 8 and side walls 9 and 10, and a front wall 11 which has a sloping portion 12. The back 7 has an aperture 13, which communicates with the attachment 15, which contains a suitable light source and a monochromator.

This invention does not concern itself with the type of light source and monochromator per se, so that the attachment 15 is merely a schematic representation of such a device. Any suitable filamentary light source may be used in connection with a prism or grating type. For the sake of simplicity of illustration, the lever 16 extending from the attachment 15 represents the wave-length control device whereby incremental values of light of certain narrow waveband such as 10 or 15 millimicrons may be selected over the visible light spectrum.

A semicylindrical mirror 17 is so oriented as to be directly in line with the aperture 13 and tilted at a desired angle to reflect the light beam on the rectangular fabric sample 18. A plate 19 is suitably held within the interior of the casing 6 at a desired angle so as to form a support for the annular ellipsoidal mirror 21. The plate 19 is also cut out to conform to the annular opening of the mirror 21 so as not to interfere with the passage of light from the cylindrical mirror to the sample 18. The annular mirror 21, by virtue of its ellipsoidal reflecting surface, collects the light reflected from the sample 18 at approximately 45° elevation and redirects it to the phototube 22 located on top 8 of the housing 6. By this arrangement, a large fraction of the reflected flux is utilized. This is also due to the fact that the sample 18 is positioned at one of the focal points of the mirror 21, whereas the phototube is located at the other focal point of the ellipse.

The sample 18 may be held in any suitable manner against the wall of the sloping front portion 12. For easy access, the device shown is provided with a sample holder in the form of a cover plate 24 pivoted in brackets 25 and 25' biased by the springs 26 and 26' so that it is held against the front wall 12. The cover plate 24 may be lifted by the knurled knob 28 for the placement of a sample in position for analysis.

Figure 2:
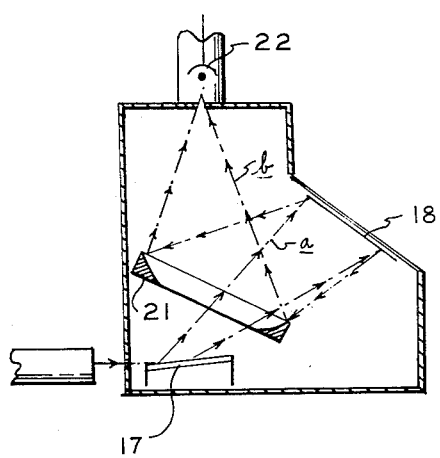
FIG. 2 is a schematic cross-sectional view of the optical illuminating device, indicating the path of the light flux.

The path of the light beam is shown in the schematic representation of FIG. 2. Broken lines and arrows indicate in a path $a$ the travel of the beam from the source 15 to the mirror 17 and from there through the annular opening in the mirror 21 onto the sample 18. The light reflected from the sample 18 shown in path $b$ is collected by the mirror 21 and directed onto the phototube 22.

Figure 3:
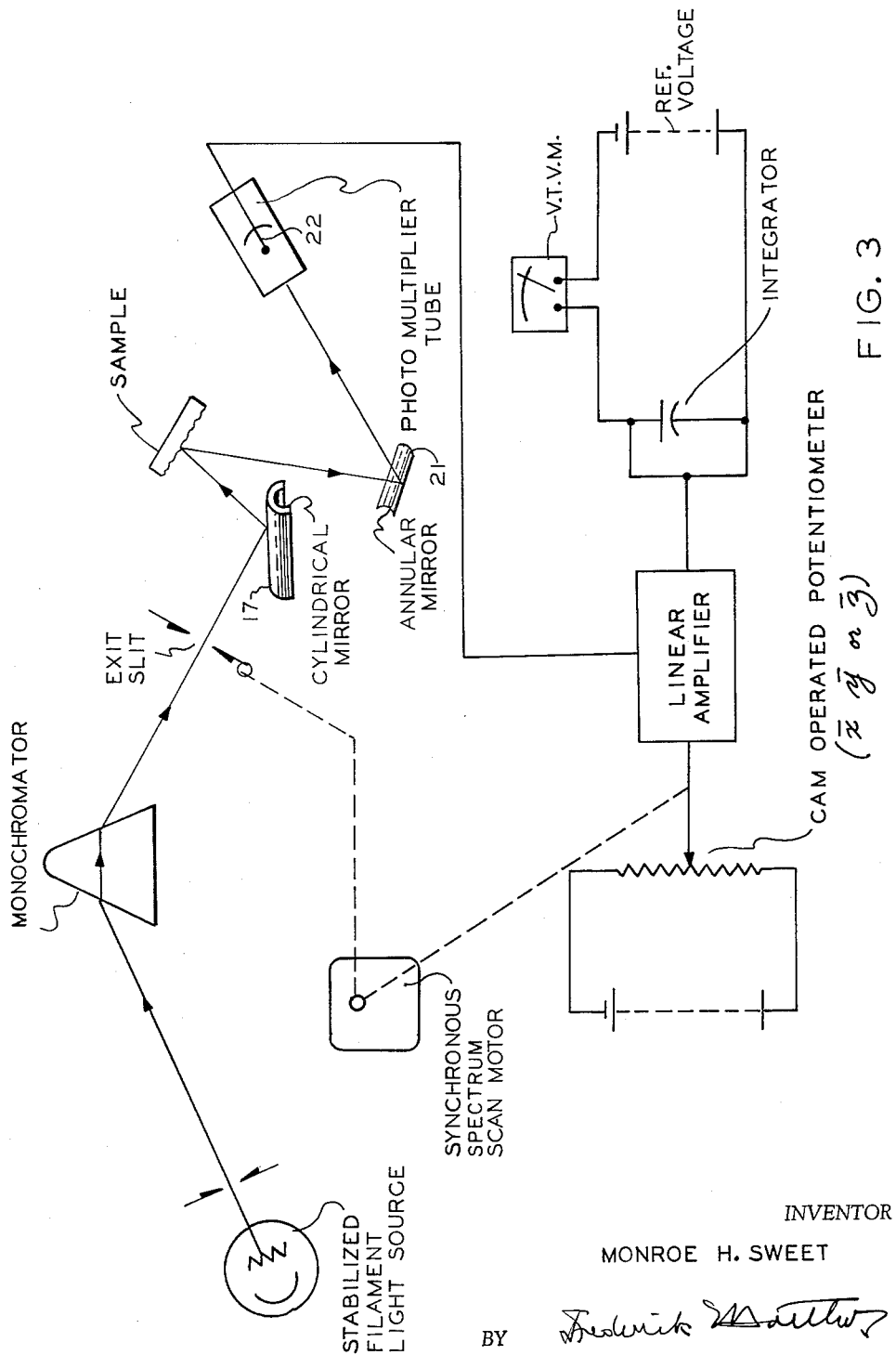
FIG. 3 is a schematic diagram of the color analyzing system.

The overall operation of the color analyzing system will now be briefly described in connection with the schematic representation of FIG. 3. The various component elements shown here need not be illustrated in detail, inasmuch as these components are standard items and may be chosen to have characteristics which will be most suitable for the system function. The light source 23 is of the concentrated filament type. In a practical embodiment, a 108 watt, 6 volt lamp proved satisfactory. It is, of course, carefully stabilized so as to maintain the lamp intensity substantially constant during the operating cycle. The monochromator is depicted by the conventional outline of a prism to indicate that white light is broken up into its elemental constituents and these can be selected by the exit slit of the monochromator, the latter being positioned by a synchronous spectrum scan motor.

The path of the light is indicated by lines and arrows and it is seen that from the exit slit of the monochromator, it is directed to the cylindrical mirror (the mirror 17 in FIG. 1), and from there, onto the sample of which the color is to be analyzed. The light reflected from the sample is directed by the annular mirror 21 onto the phototube 22. In order to obtain high sensitivity, the phototube employed is preferably of the photomultiplier type. This is properly stabilized by a suitable power supply (not shown here) in order to maintain the sensitivity constant at a desired level. The output of the photomultiplier tube is fed into a linear amplifier, the response of which is varied simultaneously with the positioning of the exit slit as the visible spectrum is scanned from one extreme wave-length position to the other. The variation of the amplifier response is controlled by the positioning of the potentiometer. This may be conveniently effected by means of suitable cams having the contours of the $\bar{x}$, $\bar{y}$, $\bar{z}$ functions, respectively, whereby the effective phototube sensitivity will conform to these curves.

The integrator measures the integral photomultiplier tube anode current as represented by the amplifier output vs. a time function for each measuring cycle. An integrator circuit particularly useful for this operation is described in my United States Patent 2,915,705. It permits a charge transfer onto a condenser in such manner that the input impedance is held at substantially zero regardless of the magnitude of the accumulated charge over wide limits. The charge of the condenser remains unchanged for a considerable period following the operating cycle, thus permitting convenient measurement of the resulting condenser voltage. The latter may be indicated directly by a vacuum tube voltmeter in terms of the tri-stimulus values X, Y or Z.

The respective tri-stimulus value is determined by performing the operating cycles in coaction with the movement of the potentiometer for each of the functions $\bar{x}$, $\bar{y}$ and $\bar{z}$ individually and readings taken of the resultant tri-stimulus values, namely X, Y and Z. From these data, the trichromatic coefficients are then calculated by substitutions in the equations given.

What is claimed is:

In a system for evaluating the color of a fabric sample in accordance with the tri-stimulus values for light reflected from said sample, comprising means for subjecting said sample to light values of the spectrum in predetermined substantially monochromatic steps over a band of wave lengths, means for holding said fabric sample in such a position as to cause the surface of said sample to receive said light values, means including an annular ellipsoidal mirror for gathering the light reflected from said sample and directing said light to a phototube, means for linearly amplifying the output voltage of said phototube, means associated with said light-subjecting means for directly modifying the response of said amplifier in accordance with each of the $x$, $z$, $y$ functions of the tri-stimulus values of the equal energy spectrum of light and means for indicating said output directly in terms of each of the tri-stimulus values, said amplifying means being directly in the same electronic circuit as both said phototube and said means for directly modifying the response of said amplifier in accordance with each of the $x$, $z$, $y$ functions of the tri-stimulus values of the equal energy spectrum of light.

References Cited by the Examiner

UNITED STATES PATENTS

| | | | |
|---|---|---|---|
| 1,763,482 | 6/1930 | Scheppmann | 88—1 |
| 1,897,219 | 2/1933 | Schroter | 88—14 |
| 2,720,811 | 10/1955 | Sziklai | 88—14 |
| 2,910,909 | 11/1959 | Stone et al. | 88—14 |
| 2,928,952 | 3/1960 | Bednarz | 250—216 |

FOREIGN PATENTS 947,752   8/1956   Germany.

JEWELL H. PEDERSEN, *Primary Examiner.*

EMIL G. ANDERSON, *Examiner.*

R. C. KLETT, E. J. CONNORS, T. L. HUDSON,
*Assistant Examiners.*

Disclaimer 3,244,061.—*Monroe H. Sweet*, Binghamton, N.Y.; *Russell P. Easton* and *First-City National Bank of Binghamton, N.Y., administrators of said Monroe H. Sweet, deceased.* DIRECT READING TRI-STIMULUS COLOR ANALYZER. Patent dated Apr. 5, 1966. Disclaimer filed Sept. 30, 1982, by the assignee, *Eastman Kodak Co.*

Hereby enters this disclaimer to all claims of said patent.
[*Official Gazette February 8, 1983.*]